United States Patent
Kagawa et al.

(10) Patent No.: US 7,728,893 B2
(45) Date of Patent: Jun. 1, 2010

(54) IMAGING DEVICE AND METHOD FOR READING SIGNALS FROM SUCH DEVICE

(75) Inventors: Keiichiro Kagawa, Ikoma (JP); Yuki Maeda, Ikoma (JP); Jun Ohta, Ikoma (JP)

(73) Assignees: Japan Science and Technology Agency, Kawaguchi-shi (JP); National University Corporation Nara Institute of Science and Technology, Ikoma-shi (JP)

( * ) Notice: Subject to any disclaimer, the term of this patent is extended or adjusted under 35 U.S.C. 154(b) by 510 days.

(21) Appl. No.: 11/666,424

(22) PCT Filed: Oct. 4, 2005

(86) PCT No.: PCT/JP2005/018321

§ 371 (c)(1),
(2), (4) Date: Apr. 27, 2007

(87) PCT Pub. No.: WO2006/048987

PCT Pub. Date: May 11, 2006

(65) Prior Publication Data

US 2008/0297615 A1 Dec. 4, 2008

(30) Foreign Application Priority Data

Nov. 2, 2004 (JP) ............................. 2004-319259

(51) Int. Cl.
*H04N 3/14* (2006.01)
*H04N 5/335* (2006.01)

(52) U.S. Cl. ...................... 348/302; 348/211.1; 348/308

(58) Field of Classification Search .............. 348/211.1, 348/211.11, 207.1, 207.11, 302, 308, 211.4, 348/211.3, 211.99
See application file for complete search history.

(56) References Cited

U.S. PATENT DOCUMENTS

| 6,181,375 B1 | 1/2001 | Mitsui et al. |
| 7,528,872 B2 * | 5/2009 | Gomi et al. ................. 348/296 |
| 2004/0101309 A1 * | 5/2004 | Beyette et al. .............. 398/115 |

FOREIGN PATENT DOCUMENTS

JP A-05-030437 2/1993

(Continued)

OTHER PUBLICATIONS

S. Miyauchi et al., "Parallel Optical Wireless Communication using High Speed CMOS Image Sensor", The Institute of Electronics, Information and Communication Engineers, vol. 104, No. 81 (May 28, 2004) pp. 7-12.

(Continued)

*Primary Examiner*—Lin Ye
*Assistant Examiner*—Nelson D. Hernández Harnández
(74) *Attorney, Agent, or Firm*—Oliff & Berridge, PLC

(57) ABSTRACT

Each pixel cell (12) of an image sensor (10) is made of a 4-Tr structure, in which only one Tr for resetting a column (X) is so added to an ordinary 3-Tr APS as to reset only an arbitrary pixel selectively, thereby to confine the pixel size. When a pixel signal is to be read, the period, for which the pixel signals composing an ordinary image of one frame are read, is finely divided so that the pixel signals of the pixels receiving an ID light for the period are read out bit by bit and repeatedly. At this time, for only the column being read, an electric current is fed to a read amplifier in the pixel cell (12) or a variable gain amplifier in an output unit (14), thereby to suppress the power consumption. As a result, a lower power consumption and a higher pixel formation can be attained in an image pickup device for picking up an image and for acquiring the ID information of a light beacon existing in the image pickup range.

10 Claims, 11 Drawing Sheets

FOREIGN PATENT DOCUMENTS

| | | |
|---|---|---|
| JP | A-2001-326857 | 11/2001 |
| JP | A2003-323239 | 11/2003 |
| JP | A-2003-345376 | 12/2003 |
| JP | A-2003-348390 | 12/2003 |
| JP | A-2004-334269 | 11/2004 |
| JP | A-2004-349765 | 12/2004 |
| JP | A-2004-349766 | 12/2004 |
| JP | A-2005-278038 | 10/2005 |
| JP | A-2005-295381 | 10/2005 |

OTHER PUBLICATIONS

Y. Oike et al., "A Smart Image Sensor With High-Speed Feeble ID-Beacon Detection for Augmented Reality System", Proc. European Solid-State Circuits Conference (ESSCIRC), (2003) pp. 125-128.

Y. Oike et al., "Smart Image Sensor with High-speed High-sensitivity ID Beacon Detection for Augmented Reality System", vol. 58, No. 6, (2004) pp. 835-841.

"What is Visible Light Communication?", Online URL. http://vlcc.net/e/e_about.html (2003).

* cited by examiner

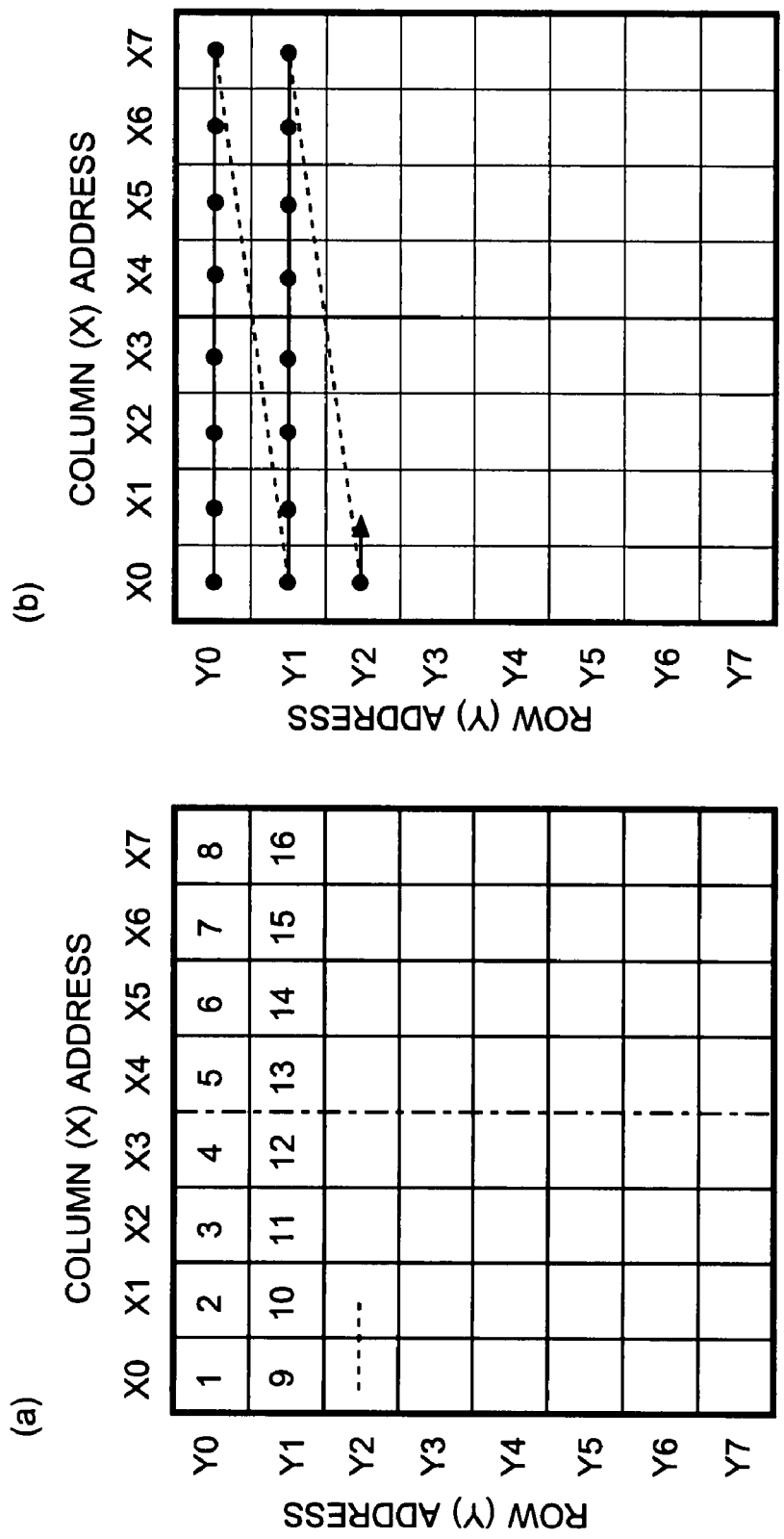

Fig. 3

| ID-RECEIVING SPEED (EXAMPLE) | | DESIGN VALUES (EXAMPLE) |
|---|---|---|
| FRAME FREQUENCY OF IMAGE SIGNAL | Fimg [fps] | 60 |
| ROW NUMBER OF PIXELS | Y [pixel] | 240 |
| NUMBER OF DIVISIONAL READING UNITS | D [pieces] | 5 |
| NUMBER OF ID LIGHTS | I [pieces] | 7 |
| ROW NUMBER OF ID-RECEIVING AREAS | R [rows] | 5 |
| HORIZONTAL SCANNING TIME OF NORMAL IMAGE | Himg = 1 / (2 × Fimg × Y) | |
| HORIZONTAL SCANNING TIME OF ID-RECEIVING AREA IMAGE | Hdata = Himg / D | |
| FRAME FREQUENCY OF ID-RECEIVING AREA IMAGE (PER ID) (=SAMPLING FREQUENCY OF ID-RECEIVING OPERATION) | Fdata = 1 / (Hdata × I × R) | 4.1 [kHz] |
| ID-RECEIVING SPEED (=ID SAMPLING FREQUENCY) | Fdata / 4 = (D × Fimg × Y) / (I × R) | 1 [kHz] |

US 7,728,893 B2

IMAGING DEVICE AND METHOD FOR READING SIGNALS FROM SUCH DEVICE

TECHNICAL FIELD

The present invention relates to an imaging device having the functions of capturing an image of an object and receiving an information light blinking or intensity-modulated at a frequency higher than a standard frame frequency within the imaging area. The present invention also relates to a method of reading signals from such an imaging device.

BACKGROUND ART

In recent years, a new type of system called the identification (ID) recognition camera system (or ID cam) has been proposed. It includes an optical beacon for emitting a blinking signal containing ID information and other items of information relating to electronic devices and a camera with a high-speed image sensor. For example, a system disclosed in Patent Document 1 captures a series of images with an ID-recognition camera and outputs them as a scene image. Then, it decodes the blinking data of the optical beacon by use of all pixel values to create an ID image. Practical applications of this ID-recognition camera system have been also proposed, such as an audio assist system disclosed in Patent Document 2 and an automatic photography system disclosed in Patent Document 3.

The above-described ID-recognition camera system has the function of displaying an image captured with the camera, on which the ID information of each of the optical beacons detected within the captured image is shown at or near the detection point of each optical beacon, allowing users to select some of the ID information according to necessity and to use the related information. Such a system enables users to select one of the electronic devices and indicators and perform data communications with the selected device or control it, using a handheld information terminal.

On the other hand, various techniques using visible light for information transmission and communication have been drawing people's attention. Some of the new approaches are aimed at data communication using indoor or outdoor lighting, traffic signals, indicators of electronic devices or similar light emitters as optical beacons (for example refer to Non-Patent Document 1).

Any system employing such an optical beacon requires a special imaging device for extracting identification information transmitted by the optical beacon present within the captured images, which are normal, two-dimensional images. In general, the signal-reading speed of an image sensor used in a normal imaging device is determined in conformity to the standard frame frequency. Typically, the frame frequency is 30 Hz (frames per second: fps). In contrast, the blinking (or intensity-modulating) frequency of an optical beacon depends on the transmission rate of the identification information. To ensure an adequate amount of information to be transmitted, the blinking or intensity-modulating frequency should be minimally several hundreds Hz, preferably 1 to 100 kHz or higher. Thus, the frequency of the optical beacon is much higher than the frame frequency. Therefore, it is difficult to correctly detect the optical beacon by generally known methods for reading pixel signals from normal image sensors.

Conventionally, some image sensors that can be used in the aforementioned type of system have been proposed. For example, a system disclosed in Non-Patent Document 2 acquires the ID signals by reading pixel signals at a frame rate of 10 kfps, which is much higher than the standard frame frequency. This method is suitable to create a high pixel density device since it allows the use of a pixel circuit approximately identical to those used in normal image sensors without hardly increasing the pixel size. However, this system consumes a considerable amount of electricity; therefore it is necessary to supply a larger amount of current to the circuit components, such as an amplifier for reading the signals, since the operation frequency of the signal-reading circuit increases with the frame frequency. For example, the power consumption of the image sensor disclosed in Non-Patent Document 2 is as high as 2 Watts, which is considerably higher than those of normal image sensors having an equal number of pixels. Incorporating such an image sensor into a small-sized information device is impractical because it will significantly shorten the operating time of the device. Furthermore, use of an image sensor consuming so much power makes the device difficult to design because the heat-releasing performance must be considered. Another problem is that the signal-to-noise (S/N) ratio of the readout signal is low. This is because the readout noise is high due to the high frequency band of the signal-reading circuit while the signal level is low due to the shorter period of time for collecting electric charges.

In a system shown in Non-Patent Document 3, an analogue circuit for detecting the light intensity modulation component of the ID signal transmitted by the optical beacon is provided for each pixel so that the identification information can be extracted within a pixel cell receiving the light emitted from the optical beacon. This method is advantageous in that, even though the signal change is minimal, the modulation component can be detected with a high S/N ratio since each pixel cell has inside a high-gain amplifier. However, this method is not suitable for creating a high pixel density device because the pixel size is considerably large due to the use of more transistors in one pixel circuit than in a pixel circuit of normal image sensors. Moreover, another factor impeding the creation of a high pixel density device is that the power consumption per pixel cell is much higher than in conventional cases since electric current must be continually supplied to the amplifier to operate the analogue circuit inside each pixel cell. This is another factor that impedes the creation of a high pixel density device.

[Patent Document 1] Unexamined Japanese Patent Application Publication No. 2003-323239

[Patent Document 2] Unexamined Japanese Patent Application Publication No. 2003-345376

[Patent Document 3] Unexamined Japanese Patent Application Publication No. 2003-348390

[Non-Patent Document 1] "Kashikou Tsuushin Toha (What is Visible Light Communication?")", [Online], Kashikou Tsuushin Consohshiamu (Visible Light Communications Consortium), [Searched on Oct. 15, 2004] Internet <URL: http://www.vlcc.net/about.html>

[Non-Patent Document 2] Miyauchi et al., "Kousoku CMOS Imeeji Sensa Wo Mochiita Nijigen Soujushinki Ni Yoru Heiretsu Hikari Kuukan Tsuushin No Teian (Parallel Optical Wireless Communication using High Speed CMOS Image Sensor"), *Shingakugihou* (*The Technical Report of the Institute of Electronics Information and Communication Engineers of Japan*), CS2004-18, 2004

[Non-Patent Document 3] Oike et al., "Fukugou Genjitukan Ouyou Ni Muketa Kousoku-Teikido ID Biikon Kenshutsu Imeeji Sensa (Smart Image Sensor with High-speed High-sensitivity ID Beacon for Augmented Reality System)", *Eijougakkaishi* (*The Journal of the Institute of Image Information and Television Engineers*), Vol. 58, No. 6, pp. 835-841, 2004

DISCLOSURE OF THE INVENTION

Problem to be Solved by the Invention

To solve the above-described problems, the present invention primarily intends to provide an imaging device for obtaining identification information from an optical beacon present within an imaging area, in which the power consumption by the image sensor and other components is suppressed and its pixels can be densely arrayed. More specifically, the present invention proposes a technique for preventing the speed of reading pixel signals from being much higher than the speed of merely reading normal image signals, or for preventing the read time per pixel from being extremely short, while suppressing the increase in the number of transistors in each pixel circuit. The present invention also provides a method of reading signals from such an imaging device.

Means for Solving the Problems

Thus, in an imaging device for capturing images of an imaging area within which a light-emitter producing an information light whose frequency is higher than the normal frame frequency is present and for collecting both image information of the imaging area and identification information transmitted by the information light, the first aspect of the present invention provides a method of reading pixel signals from an image sensor having a pixel cell array with pixel cells two-dimensionally arranged in the form of a matrix having m rows and n columns (where m and n are integers larger than one), which is characterized by the following steps:

classifying all the pixel cells into two types: one or more pixel cells receiving the information light, which are called the signal-receiving pixel cells, and the other pixel cells, which are called the imaging pixel cells;

dividing a first period of time for sequentially reading the pixel signals from the imaging pixel cells for constructing one frame of image into a plurality of fractional time sections, and inserting a second period of time for reading the pixel signal from the signal-receiving pixel cell between each neighboring pair of the time sections; and reading the pixel signal from the same signal-receiving pixel cell more than one time during one round of readout of the pixel signals from all the imaging pixel cells through all the time sections.

The second aspect of the present invention provides an imaging device for sequentially reading pixel signals by the method according to the first aspect of the present invention, which is characterized by the following elements;

a) a pixel cell array with a plurality of pixel cells two-dimensionally arranged in the form of a matrix having m rows and n columns (where m and n are integers larger than one), each pixel cell having a photoelectric conversion element for converting a received light to a charge signal and storing the charge signal;

b) a position information storage section for keeping information indicating the position of one or more signal-receiving pixel cells receiving the information light among all the pixel cells;

c) a column selection controller operating on the basis of the information stored in the position information storage section, for determining, column by column, whether the pixel cell at a given column in a row specified within the pixel cell array is a signal-receiving pixel cell, and for generating a column selection information based on the result of determination, where the column selection information decides whether or not the pixel signal should be read from the pixel cell concerned; and d) an output current controller for preventing an output current from flowing into the pixel cell at any column that has not been selected for readout by the column selection controller.

Effect of the Invention

In general, the percentage of the area receiving the information light within the pixel cell array is small. Therefore, among all the m×n pixel cells, the number of signal-receiving pixel cells can be regarded to be much smaller than that of the imaging pixel cells. Accordingly, in the signal-reading method according to the first aspect of the present invention, even if the readout of the pixel signal from each signal-receiving pixel cell is repeated more than one time within the second periods of time inserted between each neighboring pair of the fractional time sections of the first period of time for reading pixel signals from all the imaging pixel cells to be used for constructing one frame of image, it will not be necessary to set the effective speed of reading the pixel signals much higher than in the normal signal-reading methods. The repetition count of reading the pixel signal from the same signal-receiving pixel cell during one normal image frame can be determined beforehand according to the frequency of the information light.

Thus, in the method of reading signals from an imaging device according to the first aspect of the present invention, it is possible to capture normal two-dimensional images and simultaneously extract identification information from an optical beacon or similar information light present within the imaging area without significantly increasing the reading speed of the pixel signals. As a result, the imaging device can operate at high speed while suppressing an increase in the power consumption.

In a mode of the method of reading signals from an imaging device according to the first aspect of the present invention, the divisional unit of the first period of time is one row of the pixel cell array. In this mode, the readout of pixel signals from the imaging pixel cells in a given row and the readout of pixel signals from one or more signal-receiving pixel cells are alternately performed.

In another mode of the method of reading signals from an imaging device according to the first aspect of the present invention, the divisional unit of the first period of time corresponds to a fractional section of one row of the pixel cell array. In this mode, the readout of pixel signals from the imaging pixel cells in a fractional section of a given row and the readout of pixel signals from one or more signal-receiving pixel cells are alternately performed.

The signal-receiving pixel cells from which the pixel signals are to be read during each round of the second periods of time may be those pixel cells located in one row within an information light-receiving area onto which one information light is cast. In this case, the readout of the pixel signals from the imaging pixel cells included in the divisional unit and the readout of the pixel signal from one or more signal-receiving pixel cells located in one row within an information light-receiving area onto which one information light is cast are alternately performed.

As opposed to the previous case, if the number of the signal-receiving pixel cells among all pixel cells cannot be regarded as much smaller than that of the imaging pixel cells, repeating the readout of pixel signals from all the signal-receiving pixel cells many times will require a higher readout speed. In practice, if the information light-receiving area is large, reducing the number of pixel cells from which the pixel signals are to be read within the aforementioned area will cause no problems because the pixel cells within that area receive the same content of information. Accordingly, if the number of signal-receiving pixel cells within one information light-receiving area is large, it is preferable to reduce the number of pixel cells from which the pixel signal is to be read by skipping a portion of the signal-receiving pixel cells or integrating the pixel signals of a plurality of the signal-receiving pixel cells. This method prevents an unnecessarily large number of pixel signals from being read from the signal-receiving pixel cells, thereby suppressing the increase in the readout speed.

In the imaging device according to the second aspect of the present invention, when a readout row is designated in the pixel cell array, if the column selection controller selects a column from which the pixel signal is to be read, the output current controller prevents the output current from flowing into the pixel cell at any column that has not been selected for readout. According to this method, a column including a signal-receiving pixel cell receives no output current during the period of time for reading pixel signals from the imaging pixel cells to obtain image signals. Conversely, a column including an imaging pixel cell receives no output current during the period of time for reading pixel signals from the signal-receiving pixel cells to obtain identification information. When no output current is flowing, the pixel-reading amplifiers in the pixel cells and the output circuit amplifier for the column concerned will be inactive and their power consumption will be virtually zero. Thus, the electric power is efficiently saved and power consumption is suppressed.

In a mode of the imaging device according to the second aspect of the present invention, the position information storage section has a memory area having a size of one row and n columns or p rows and n columns ($2 \leq p < m$) to be associated with one information light-receiving area, where the binary signal level ("High" or "Low") of one bit of the memory area corresponding to one column of the pixel cell array is determined according to whether a signal-receiving pixel cell belonging to the information light-receiving area concerned is present within that particular column.

This mode reduces the size of the memory area of the position information storage section. Therefore, it is easy to install this function on a chip of the image sensor including the pixel cell array. Particularly, associating p rows of pixel cells with one bit of memory area in each column will be effective in decreasing the capacity of the memory area of the position information storage section, although the horizontal resolution will be lower.

In the imaging device according to the second aspect of the present invention, each pixel cell included in the pixel cell array may preferably include a potential-reset element for a pixel-by-pixel resetting of the electric potential charged in the photoelectric conversion element inside the pixel cell.

This imaging device does not reset the photoelectric conversion element inside each pixel cell one row at a time but allows any pixel cell in a given row to be reset anytime. Therefore, the charging periods for the signal-receiving pixel cells and the imaging pixel cells can be independently and freely determined.

More specifically, the potential-reset element may include two kinds of transistors connected in series, one of which is turned on and off by a column-reset signal supplied through a column-reset line provided for each column of the pixel cell array, and the other is turned on and off by a row-reset signal supplied through a row-reset line provided for each row of the pixel cell array. In other words, each pixel cell is reset by an XY-addressing technique.

According to this construction, an independently resettable pixel cell can be created by adding only one transistor to a three-transistor (or four-transistor) circuit used in the pixel circuits of conventional, typical CMOS (complementary metal-oxide semiconductor) image sensors. Therefore, the pixel circuit will not be much larger than those used in normal image sensors. Thus, a high level of pixel density can be easily achieved.

In the imaging device according to the second aspect of the present invention, each column of the pixel cell array may be provided with a variable-gain amplifier for amplifying the pixel signals produced by the pixel cells in the column with a different gain determined according to the level of the pixel signals.

If the charging period for the signal-receiving pixel cells differs from that for the imaging pixel cells, a significant difference will inevitably result between the levels of the pixel signals. If the level of an input signal is low, the gain of the variable-gain amplifier is raised to correct the difference between the level of the pixel signals produced by the imaging pixel cells and that of the pixel signals produced by the signal-receiving pixel cells. As a result, for example, it will be easier to synthesize a normally captured image and an identification information image indicative of the position of an optical beacon.

BRIEF DESCRIPTION OF THE DRAWINGS

FIG. 2 is a schematic diagram of the pixel construction of an image sensor, for explaining the basic principle of a conventional, typical method of reading image signals.

FIG. 3 is a table roughly showing the relationships between the ID-receiving speed and other parameters.

BEST MODE FOR CARRYING OUT THE INVENTION

An example of a free-space optical communication system using an imaging device according to the present invention is described with reference to the attached drawings.

Figure 11:
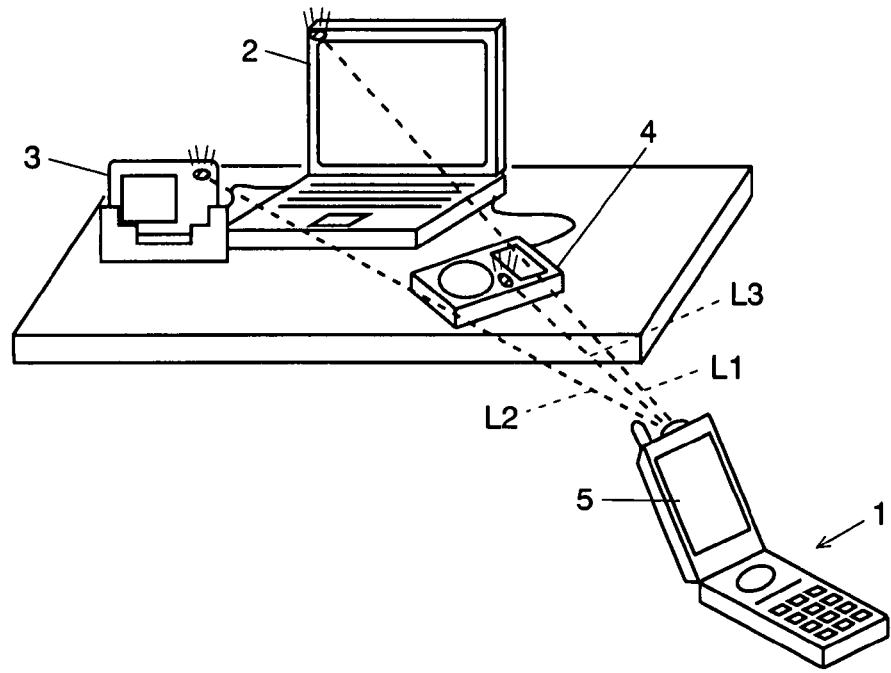
FIG. 11 is a schematic general view of a free-space optical communication system employing a method of reading signals from an imaging device according to the present invention.

FIG. 11 is a schematic view of the present free-space optical communication system. The information terminal 1, which is hand-held by a user (not shown), is a mobile phone capable of free-space optical communication. The personal computer 2, digital camera 3 and portable music player 4 are communication nodes capable of sending an ID signal (which corresponds to the identification information in the present invention) through an optical beacon to the information terminal 1. For example, this optical beacon can be created using a light-emitting diode for indicating the on/off state of an electronic device.

Figure 13:
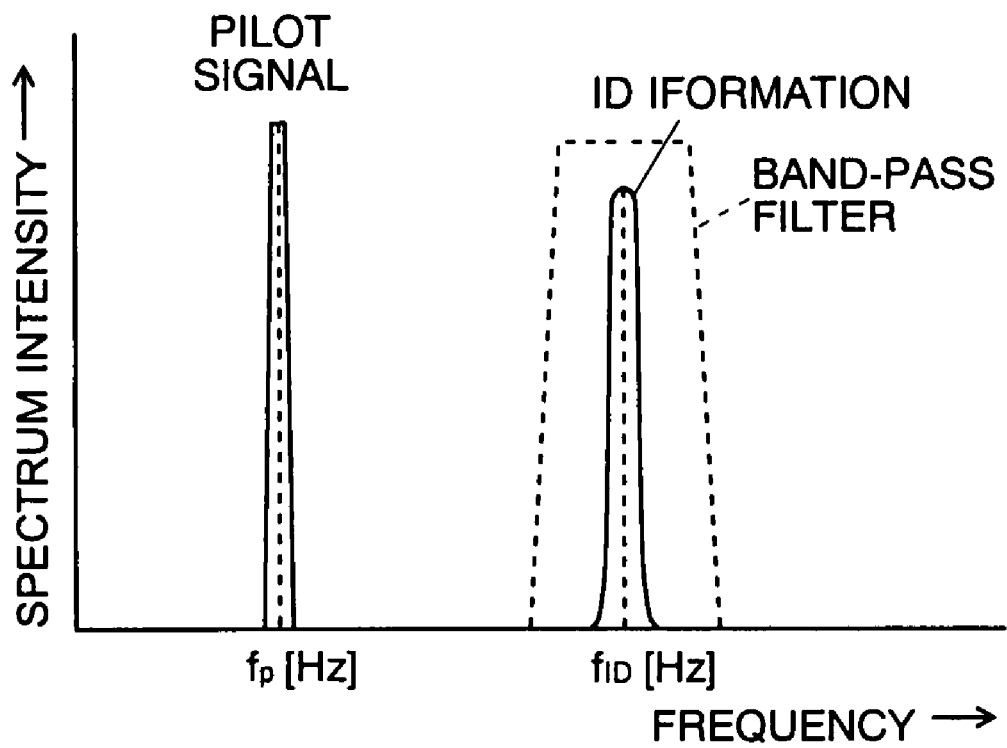
FIG. 13 is a graph showing the frequency spectrums of the signals contained in the light emitted from the optical beacon of each communication node.

FIG. 13 is a graph showing the frequency spectrums of the signals contained in the light emitted from the optical beacon of each communication node. The pilot signal is a signal that blinks (or changes its intensity) at a frequency of $f_p$ lower than one-half of the standard frame frequency (30 Hz). This pilot signal is common to all the communication nodes. The main function of the pilot signal is to make the position of each device recognizable to the information terminal 1. The ID information has a frequency band spread around the central frequency $f_{ID}$ of about 1 kHz, which is much higher than the frequency $f_p$ of the pilot signal. This signal contains various items of information, including an inherent address having a long bit length, like an IPv6 address, uniquely assigned to each communication node, and operational condition data of the device concerned.

To enable the transmission of image data or audio data at high speeds, it is possible to superimpose another signal onto the light emitted from the optical beacon within a frequency band higher than the frequency of the ID signal. Alternatively, those kinds of data may be transmitted by Bluetooth® or other radio communication techniques without using optical communications.

Figure 12:
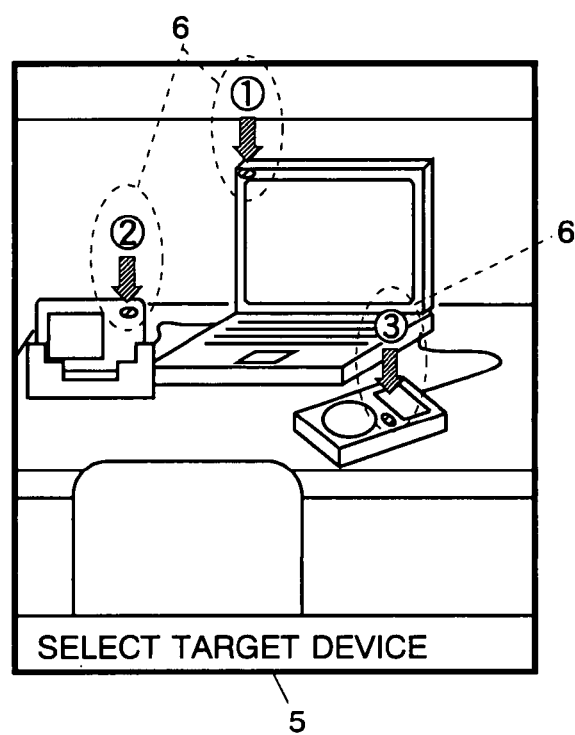
FIG. 12 is a schematic view of an image shown on the display of an information terminal used in the system shown in FIG. 11.

When the user wants to have a data communication with a certain communication node or control a certain communication node, for example, he or she directs the camera of the information terminal 1 to that communication node. Then, as shown in FIG. 12, a two-dimensional image of the space included in the imaging area of the camera is displayed on the screen of the display 5 of the information terminal 1. In this state, the optical beacon of each active communication node within the imaging area is detected by a method to be explained later. Then, in proximity to each optical beacon, identification information 6 (which is hereby a serial number) for selecting the corresponding communication node is displayed on the screen. Any communication node having the identification information displayed can perform a data communication with the information terminal 1 or be controlled from the information terminal 1. The user can select a communication node and send predetermined commands to that node by performing predetermined operations on the information terminal 1.

The imaging device according to the present invention is built into the information terminal 1. It has the function of collecting image signals for reproducing the captured image, and ID information originating from the optical beacon of each communication node. As will be explained later, the imaging device includes an image sensor. One of the important characteristics of this device exists in its method of reading pixel signals from the image sensor. The basic principle of this signal-reading method is described below with reference to FIGS. 1 and 2.

Figure 1:
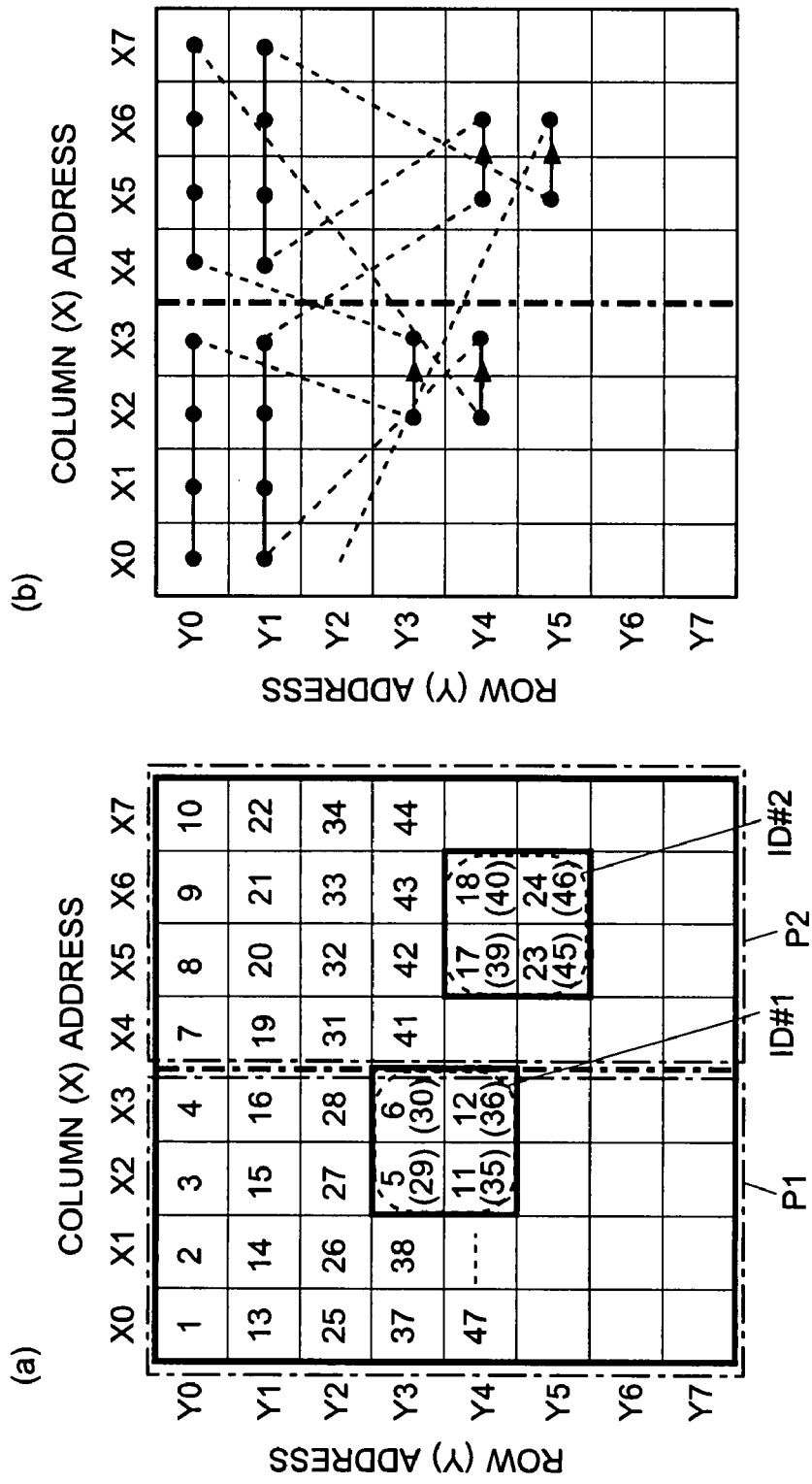
FIG. 1 is a schematic diagram of the pixel construction of an image sensor, for explaining the basic principle of the signal-reading method according to the present invention.

FIGS. 1 and 2 schematically show the pixel construction of an image sensor, where FIG. 1 shows the method of reading pixel signals according to the present invention, and FIG. 2 shows a conventional, typical method of reading pixel signals. In each of FIGS. 1 and 2, (a) shows serial numbers indicating the order of reading the pixel signals, and (b) shows the same reading order by trajectories (lines).

To simplify the explanation, it is hereby assumed that a total of 64 pixel cells 12 are two-dimensionally arrayed in the form of an 8×8 matrix having eight columns arranged in the row (X) direction and eight rows in the column (Y) direction. It should be understood that the number of pixel cells actually used is much larger than in the present example. The column addresses X0 through X7 are assigned to the columns, respectively. Similarly, the rows have the row addresses Y0 through Y7, respectively. The position of each pixel cell is represented by a combination of column (X) and row (Y) addresses, e.g. (X0, Y0) or (X3, Y7). By this notation, any of the pixel cells can be identified. As will be detailed later, each pixel cell has a photodiode as a photoelectric conversion element. A ray of light cast on the pixel cell array is photoelectrically converted by each photodiode, whereby each pixel cell independently produces an electric signal (or pixel signal).

In the conventional, typical signal-reading method, the electric charge produced by the photoelectric conversion is accumulated at every pixel for a predetermined charging period. Then, in the subsequent readout period, the pixel signal is read from each pixel cell in ascending order of the row addresses and also in ascending order of the column addresses within each row. Normally, the frame frequency of the image is 30 Hz. Therefore, the charging period and the readout period are assigned within a single frame period of 30 Hz. All the pixel signals are read out during that readout period and processed by an external image-processing circuit to reproduce a piece of image. As a result, one image is obtained in every frame period, normally at intervals of 33.3 milliseconds.

In contrast, the object whose image is to be captured by the imaging device according to the present invention includes an optical beacon containing ID information. The optical beacon, which may be found at any location within the imaging area, is blinking or changing its intensity at a frequency much higher than the frame frequency, within a range from several hundreds hertz to several kilohertz. The position of the optical beacon within the captured image can be recognized by the pilot signal superimposed in a separate frequency band, as explained earlier. If this pilot signal is blinking at a frequency lower than one half of the frame frequency (preferably, lower than a quarter), the pilot signal can be detected by calculating the difference between continuously captured images or by carrying out a frequency filtering process at each pixel. Based on the pilot signal detected, the area of the pixel cells receiving the light emitted from the optical beacon (which is called the ID light hereinafter) can be recognized.

As shown in FIG. 1(a), in the present example, there are two different ID lights present within the imaging area. One ID light-receiving area ID#1 spreads over four pixel cells: (X2, Y3), (X3, Y3), (X2, Y4) and (X3, Y4). The other ID light-receiving area ID#2 spreads over four pixel cells: (X5, Y4), (X6, Y4), (X5, Y5) and (X6, Y5).

The signal-reading method according to the present invention includes a characteristic readout process for obtaining ID information from ID light in parallel to collecting image signals for reproducing normal images. In brief, all the pixel cells are divided into two types: those present within the ID light-receiving area (which correspond to the signal-receiving pixel cells in the present invention), and those present within the area capturing only normal images (which correspond to the imaging pixel cells in the present invention). Then, a plurality of readout periods for reading pixel signals from the same signal-receiving pixel cells in a time-sharing manner are arranged within the period of time for reading pixel signals from all the imaging pixel cells for reproducing one frame of image.

In the present example, there are eight signal-receiving pixel cells: the four pixel cells (X2, Y3), (X3, Y3), (X2, Y4) and (X3, Y4) present within the ID light-receiving area ID#1 and the other four pixel cells (X5, Y4), (X6, Y4), (X5, Y5) and (X6, Y5) present within the ID light-receiving area ID#2. The other fifty-six pixel cells are the imaging pixel cells. The pixel cells are divided into two groups by their column addresses: X0-X3 and X4-X7. Now, let the divisional area having the column addresses of X0-X3 be denoted by P1, and the other divisional area having the column addresses of X4-X7 by P2.

The present readout process follows these instructions:

(1) In each row of each divisional area (P1 or P2), the imaging pixel cells should be continuously read in ascending order of their column addresses.

(2) After the readout of the imaging pixel cells in one row of one divisional area is completed, the signal-receiving pixel cells in one row of one ID light-receiving area should be read in ascending order of their column addresses.

(3) After the readout of the signal-receiving pixel cells in one row of one ID light-receiving area is completed, the readout point should be moved from the divisional area containing the imaging pixel cells that have been previously read to the other divisional area, where the readout operation should be restored. If the readout of all the imaging pixel cells in one row has been already completed, the readout point should be moved to the next row. If the readout of all the imaging pixel cells in one row has not been completed, the operation should restart from the remaining section of the same row.

(4) Concerning the readout of the signal-receiving pixel cells, priority should be given to the cells belonging to the same ID light-receiving area. After the readout of the signal-receiving pixel cells in one ID light-receiving area is completed, the readout point should be moved to the signal-receiving pixel cells in the next ID light-receiving area. When one readout round of the signal-receiving pixel cells is completed through all the ID light-receiving areas, the readout process should return to the first ID light-receiving area and repeat the same steps.

More specifically, referring to FIG. 1, pixel signals are read from the imaging pixel cells having the row address Y0 in ascending order of their column addresses: X0, X1, X2 and X3. Thus, the readout of one row of the imaging pixel cells in the divisional area P1 is completed. Next, pixel signals are read from two pixel cells (X2, Y3) and (X3, Y3) in one row of the signal-receiving pixel cells in the ID light-receiving area ID#1, whereby the readout of one row of the signal-receiving pixel cells in one ID light-receiving area is completed. Then, the readout point now moves to the next divisional area P2, where pixel signals are read from the imaging pixel cells in the remaining section of the row having the address Y0, in the order of their column addresses: X4, X5, X6 and X7. Subsequently, pixel signals are read from two signal-receiving pixel cells (X2, Y4) and (X3, Y4) in the second row of the ID light-receiving area ID#1.

Thus, the pixel signals produced by the imaging pixel cells and those produced by the signal-receiving pixel cells are sequentially read out. After the readout of the pixel signal from the pixel cell (X3, Y2) is completed, the signals are again read from the signal-receiving pixel cells (X2, Y3) and (X3, Y3) in the first row of the ID light-receiving area ID#1, which have already been read one time. Subsequently, according to the previous instructions, the pixel signals are read from all the pixel cells, at least one time for each cell. As a result, during the period for reading pixel signals necessary for constructing one frame of image, the pixel signal will be repeatedly read from each signal-receiving pixel cell of the same ID light-receiving areas ID#1 and ID#2 multiple times.

After the pixel signal is read, the photodiode of the signal-receiving pixel cell is immediately reset and starts to accumulate an electric charge according to the amount of light received. As a result, the readout of the pixel signal from each signal-receiving pixel cell in the ID light-receiving areas ID#1 and ID#2 and the accumulation of electric charge will be repeated at shorter intervals of time (i.e. at a frequency higher than the frame frequency). In the example of FIG. 1, the pixel signal is read from each signal-receiving pixel cell in the ID light-receiving areas ID#1 and ID#2 four times during the period for reading image signals for one frame of image. Thus, it can be said that, as far as the signal-receiving pixel cells are concerned, the pixel signal is read at an effective frame frequency higher than the frame frequency of normal images.

Since the signal is read four times from one pixel cell from which the signal was conventionally read only one time within one frame period, it is necessary to set the readout speed per pixel cell higher than in the conventional cases if the image is to be repeatedly captured at the normal frame frequency, 30 Hz. However, as long as the total number of pixel cells in the ID light-receiving areas is significantly less than the total number of the pixel cells, the increase in the readout speed is adequately small.

From an opposite point of view, this means that, if an ID light-receiving area is abnormally large or a large number of ID lights are simultaneously detected, it will be necessary to significantly increase the readout speed because there are a considerable number of the signal-receiving pixel cells against the total number of pixel cells. The transmission rate of ID information depends on the readout frequency of the ID information. In the previous example, the transmission rate of the ID information increases with the repetition count of reading the signal-receiving pixel cells of the same ID light-receiving area during the period for reading pixel signals for one frame of image.

In summary, there are tradeoff relations between the transmission rate (or receiving speed) of ID information, the frame frequency of image signals, the number of ID lights that can be simultaneously received, the size of the ID light-receiving area, and other factors. The values of these parameters should be appropriately selected. FIG. 3 shows rough calculations of an ID-receiving speed from several parameters with examples of design values of the imaging device. As will be detailed later, the signal-reading method according to the present invention is capable of collecting ID information and image information in parallel without significantly increasing the readout speed.

In the previous example, all the pixel cells were divided along the column direction into two divisional areas P1 and P2. The number of divisional areas may be larger than two. It is possible to alternately read the imaging pixel cells and the signal-receiving pixel cells, row by row, without defining the divisional areas. For example, the readout process may be as follows: first, the pixel signals of all the imaging pixel cells having the row address Y0 are read; then, the pixel signals of the signal-receiving pixel cells in the first row of the ID light-receiving area ID#1 are read; subsequently, the pixel signals of all the imaging pixel cells having the row address Y1 are read, and so on. It is also possible to assign multiple rows of the signal-receiving pixel cells of the ID light-receiving area to one row of the imaging pixel cells. For example, the readout process may be as follows: first, the pixel signals of all the imaging pixel cells having the row address Y0 are read; then, the pixel signals of the signal-receiving pixel cells in the first and second rows of the ID light-receiving area ID#1 are read; subsequently, the pixel signals of all the imaging pixel cells having the row address Y1 are read, and so on.

Figure 4:
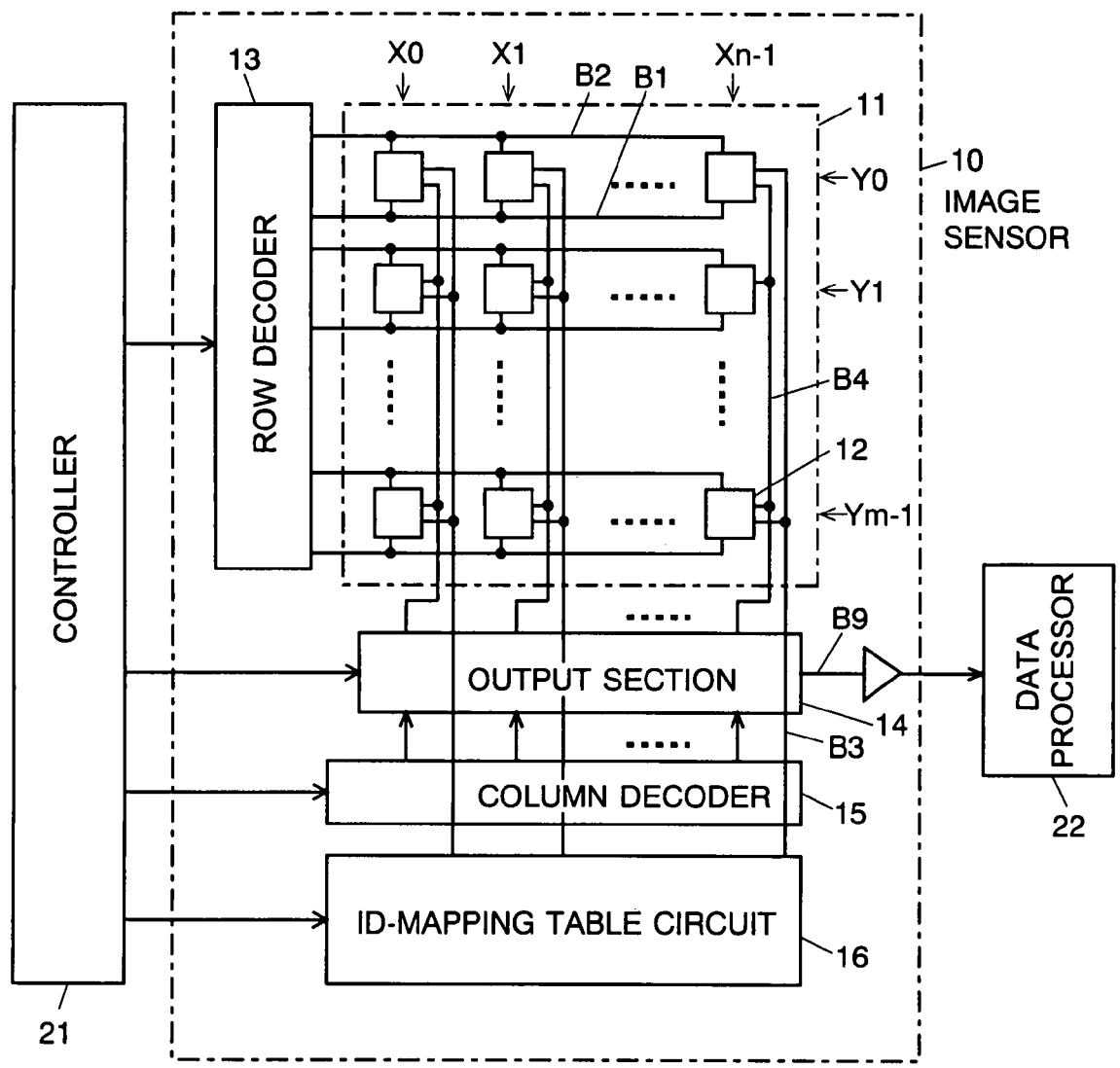
FIG. 4 is a block diagram schematically showing an imaging device including an image sensor according to an embodiment of the present invention.
Figure 5:
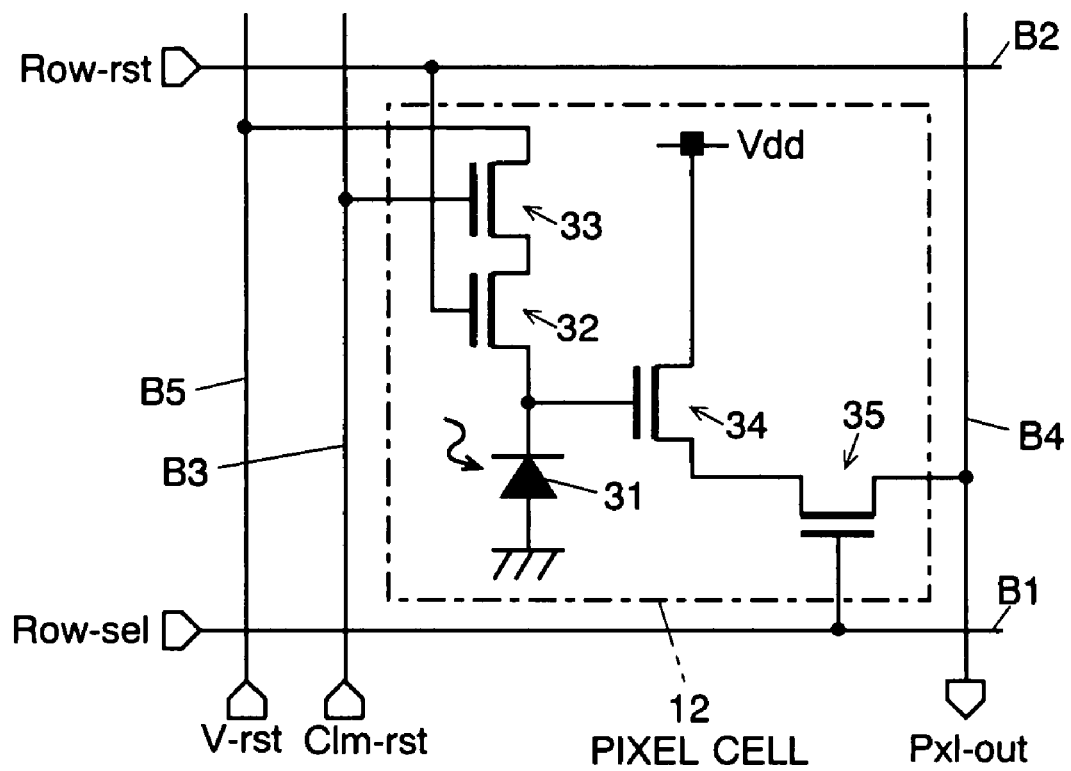
FIG. 5 is a circuit diagram showing the construction of one pixel cell of the image sensor shown in FIG. 4.
Figure 6:
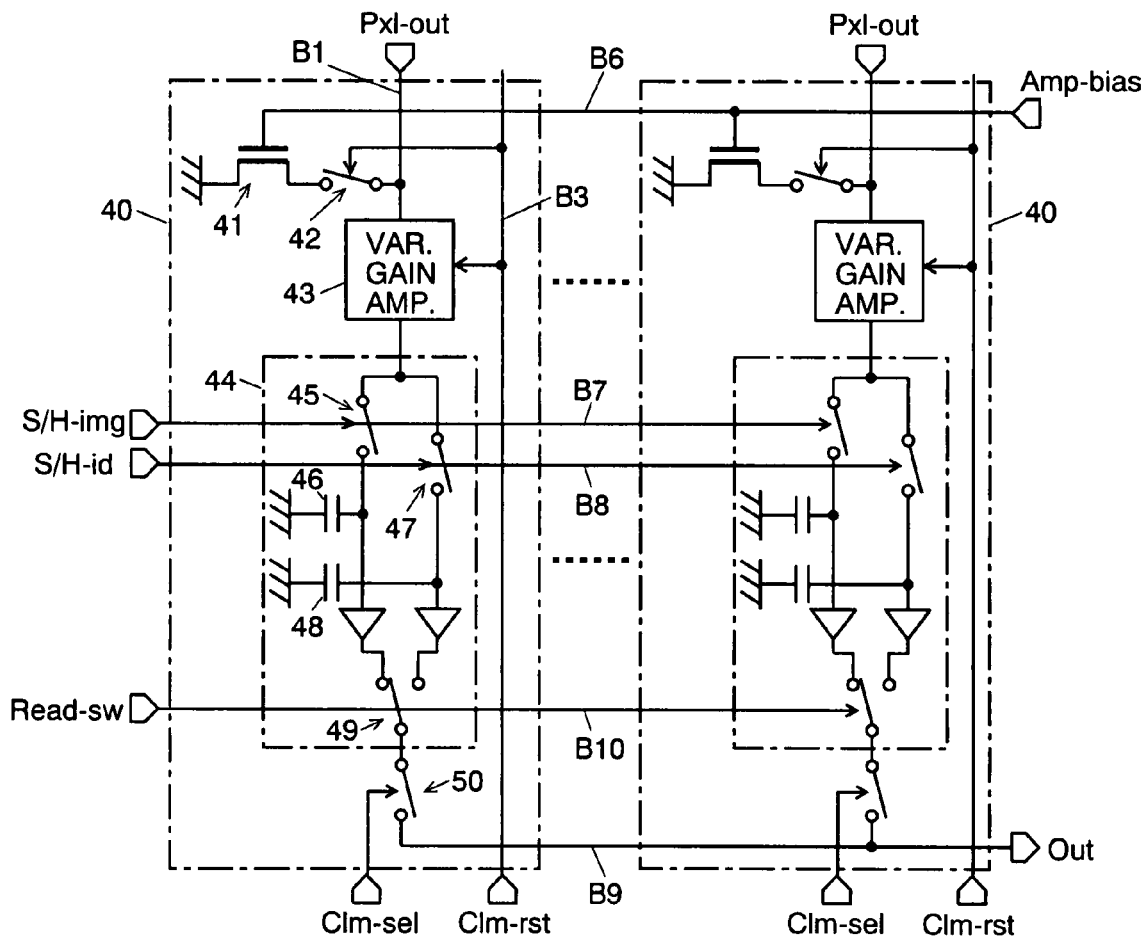
FIG. 6 is a schematic diagram roughly showing the construction of the output section in the image sensor shown in FIG. 4.
Figure 7:
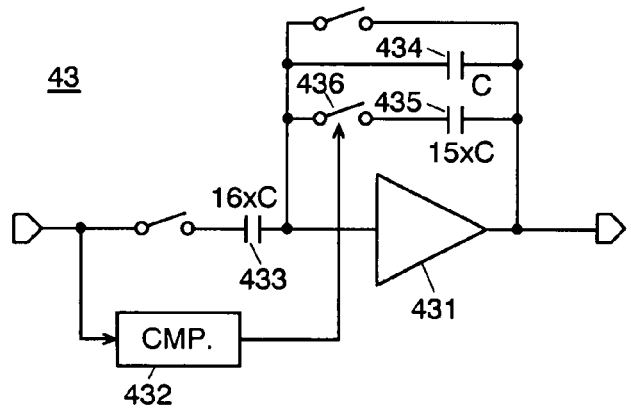
FIG. 7 is a schematic diagram of one variable-gain amplifier shown in FIG. 6.

Next, an embodiment of the imaging device for carrying out the readout operation described thus far is explained. FIG. 4 is a block diagram schematically showing the imaging device including an image sensor according to the present embodiment. FIG. 5 is a circuit diagram showing the construction of one pixel cell of the image sensor. FIG. 6 is a schematic diagram roughly showing the construction of the output section in the image sensor. FIG. 7 is a schematic diagram of one variable-gain amplifier used in the image sensor.

The image sensor 10 includes a pixel cell array 11, row decoder 13, output section 14, column decoder 15, ID-mapping table circuit 16 and other components. The pixel cell array 11 has pixel cells two-dimensionally arranged in the form of an m×n matrix having n columns arranged along the column (X) direction and m rows arranged along the row (Y) direction. The values of m and n can be chosen as desired. In the present example, n=320 and m=240. The value of m corresponds to the number of pixel rows in FIG. 3.

The row decoder 13 has the functions of selecting multiple pixel cells 12 in the same row of the pixel cell array 11 through the row-selection signal (Row-sel) line B1 and resetting multiple pixel cells 12 in the same row through the row-reset signal (Row-rst) line B2. The output section 14 includes sample-and-hold circuits each provided for each column of the pixel cell array 11. Pixel signals produced by the pixel cells are sent through the pixel output signal (Pxl-out) lines B4 to the output section 14, which outputs those signals one after another through the same horizontal output signal (Out) line B9. The column decoder 15 controls the output section 14 so that the signals are outputted in series. The ID-mapping table circuit 16 includes a memory for holding position information of an ID light-receiving area in the pixel cell array 11 and a control circuit for that memory.

Located outside the image sensor 10 is a controller 21 for feeding control signals to each section of the image sensor 10 and a data processor 22 for receiving the series of pixel signals produced by the image sensor 10 and for performing predetermined data-processing. Using the received pixel signals, the data processor 22 reproduces one image per one image frame from the pixel signals produced by the imaging pixel cells and restores ID information from the pixel signals produced by the signal-receiving pixel cells. The data processor 22 may be a dedicated digital signal processor (DSP) or other hardware elements. Alternatively, it is possible to introduce the output signals through an interface circuit into a computer having a CPU and other components so that the computer can function as the data processor by performing necessary operations. A portion of the functions of the controller 21 or data processor 22 may be installed on the same chip. The point is that there is no restriction on the chip structure and other factors when constructing the device.

As shown in FIG. 5, one pixel cell 12 includes one photodiode 31 and four MOS transistors 32, 33, 34 and 35. The anode of the photodiode 31 is grounded and the cathode is connected to both the first transistor 32 functioning as a row-reset switch and the gate terminal of the third transistor 34 functioning as a source follower amplifier. The first transistor 32 is connected through the second transistor 33 to the reset voltage signal (V-rst) line B5. The gate terminal of the first transistors 32 is connected to the row-reset signal line B2. The gate terminal of the second transistor 33 is connected to the column-reset signal (Clm-rst) line B3. Normally, a direct voltage Vr slightly lower than the power-supply voltage Vdd is applied to the reset voltage signal line B5. However, the reset voltage signal line B5 may be connected to the supply line of the power-supply voltage Vdd.

The source terminal (or output) of the third transistor 34 is connected through the fourth transistor 35 to the pixel output signal line B4. The gate terminal of the fourth transistor 35 is connected to the row-selection signal line B1. The first transistor 32 functioning as a row-reset switch and the second transistor 33 functioning as a column-reset switch are connected in series. Therefore, when both the row-reset signal (Row-rst) and the column-reset signal (Clm-rst) are switched to "High" level, the photodiode 31 of the corresponding pixel cell 12 is selectively reset. Thus, any of the pixel cells can be independently reset.

The basic process of photoelectric conversion and signal output by this pixel cell 12 is as follows: when both the row-reset signal (Row-rst) and the column-reset signal (Clm-rst) are switched to the "High" level, the first and second transistors 32 and 33 are turned on. Then, the potential at the cathode of the photodiode 31 (which is called the "photodiode potential" hereinafter) is reset to the voltage Vr supplied through the reset voltage signal line B5. Under the condition that at least one of the first and second transistors 32 and 33 is off, if a ray of light falls onto the photodiode 31, a photoelectric current depending on the strength of the light flows through the photodiode 31. Due to an electric discharge caused by this current, the photodiode potential gradually falls. The falling speed of the potential depends on the strength of the received light. The speed is higher as the light is stronger.

When the fourth transistor 35 is off, this pixel cell 12 is separated from the pixel output signal line B4. If the row-selection signal (Row-sel) supplied to the row-selection signal line B1 is switched to the "High" level, the fourth transistor 35 turns on. In this state, depending on the photodiode potential at the moment, the current signal flowing to the third transistor 35 functioning as the source follower amplifier can be supplied to the pixel output signal line B4. Whether the output current actually flows or not depends on the presence of a load connected to the pixel output signal line B4, as will be explained later.

In the pixel cell 12, the source follower amplifier consisting of the third transistor 34 is basically a simple buffer amplifier. Such a pixel cell 12 can be basically constructed by adding only one row-resetting transistor to a pixel cell used in a conventional three-transistor type CMOS image sensor. Its pixel size can be approximately equal to that of a pixel of a conventional, typical CMOS APS (active pixel sensor) image sensor. Therefore, the present pixel cells can be closely arranged so that the pixel cell array 11 can have a large number of pixels without increasing its area.

As shown in FIG. 6, the output section 14 has an output circuit unit 40 for each column. The output circuit unit 40 includes a transistor 41 functioning as a load current source according to the voltage signal fed through the bias voltage signal (Amp-bias) line B6, a load switch 42 for connecting the transistor 41 as a load to the pixel output signal line B4 or disconnecting the same transistor from the line B4, a variable-gain amplifier 43, a sampling-and-holding circuit 44 and an output-selection switch 50. In each column, the 240 pieces of pixel cells 12 are all connected to the common pixel output signal line B4, through which a current signal is supplied. When the load switch 42 is on, the transistor 41 converts the current signal to a voltage signal. This signal is then amplified by the variable-gain amplifier 43 according to necessity and sent to the sampling-and-holding circuit 44.

In the variable-gain amplifier 43, as shown in FIG. 7, a comparator 432 or similar circuit element compares an input voltage with a predetermined reference voltage. If the input voltage is equal to or higher than the reference voltage (or if the pixel output is much lower than one sixteenth of the output amplitude), the gain switch 436 is turned off to disconnect the second feedback capacitor 435 and the gain of the amplifier 431 is raised to a level sixteen times the previous level. If the input voltage is lower than the reference voltage, the gain switch 436 is turned on so that the capacitance of the input capacitor 433 equals the total capacitance of the second feedback capacitors 434 and 435, whereby the gain of the amplifier 431 is set to one.

As explained earlier, the pixel signal of the signal-receiving pixel cell is read more frequently than that of the imaging pixel cell. However, its charging time is accordingly short and the level of its pixel signal is low. Therefore, if the level of the pixel signal is adequately low, the signal level is raised by increasing the gain of the variable-gain amplifier 43 to a level sixteen times the previous level. As a result, the level difference between the pixel signals produced by the imaging pixel cells and those produced by the signal-receiving pixel cells are made to be as small as possible. Furthermore, saturation of the amplifier 431 is prevented, which occurs when the amplitude of the input voltage is large. Though not shown in the drawings, the information indicating the current selection of the gain is stored in association with the pixel signals. As will be explained later, when those pixel signals are outputted, the gain selection information associated with them is also outputted in parallel. The data processor 22 uses this gain selection information in the data processing. An example of the amplifier 431 is an inverting amplifier, such as a source-common amplifier.

In the present embodiment, the variable-gain amplifier 43 evaluates the input voltage amplitude by two levels. Alternatively, it is possible to evaluate the amplitude by three or more levels for a finer selection of the gain levels. For that purpose, the comparator 432 may include multiple comparators having different thresholds or multiple levels of reference voltages may be sequentially inputted into a single comparator. In the latter case, the input voltage amplitude can be evaluated by the timing at which the output value of the comparator is inverted.

The sampling-and-holding circuit 44 has two independent sampling-and-holding sections: The first section is for the sampling and holding of image signals and includes an image signal-sampling switch 45 and an image signal-holding capacitor 46. The second section is for the sampling and holding of ID signals and includes an ID signal-sampling switch 47 and an ID signal-holding capacitor 48. The on/off state of the switch 45 at each column can be controlled through the image-sampling signal (S/H-img) line B7. The on/off state of the switch 47 at each column can be controlled through the ID-sampling signal (S/H-id) line B8. The read-out-selection signal (Read-sw) line B10 is used to control an image/ID selection switch 49, which is used to select either the capacitor 46 or 48 when the voltage held by the capacitor is to be outputted.

Each output circuit unit 40 includes an output-selection switch 50, whose on/off state is controlled by an output column selection signal (Clm-sel) given from the column decoder 15 so that the voltage signal held by either the capacitor 46 or 48 of the sampling-and-holding circuit 44 of each output circuit unit 40 is selected one after another and sent through the horizontal output signal line B9 to the outside.

Figure 8:
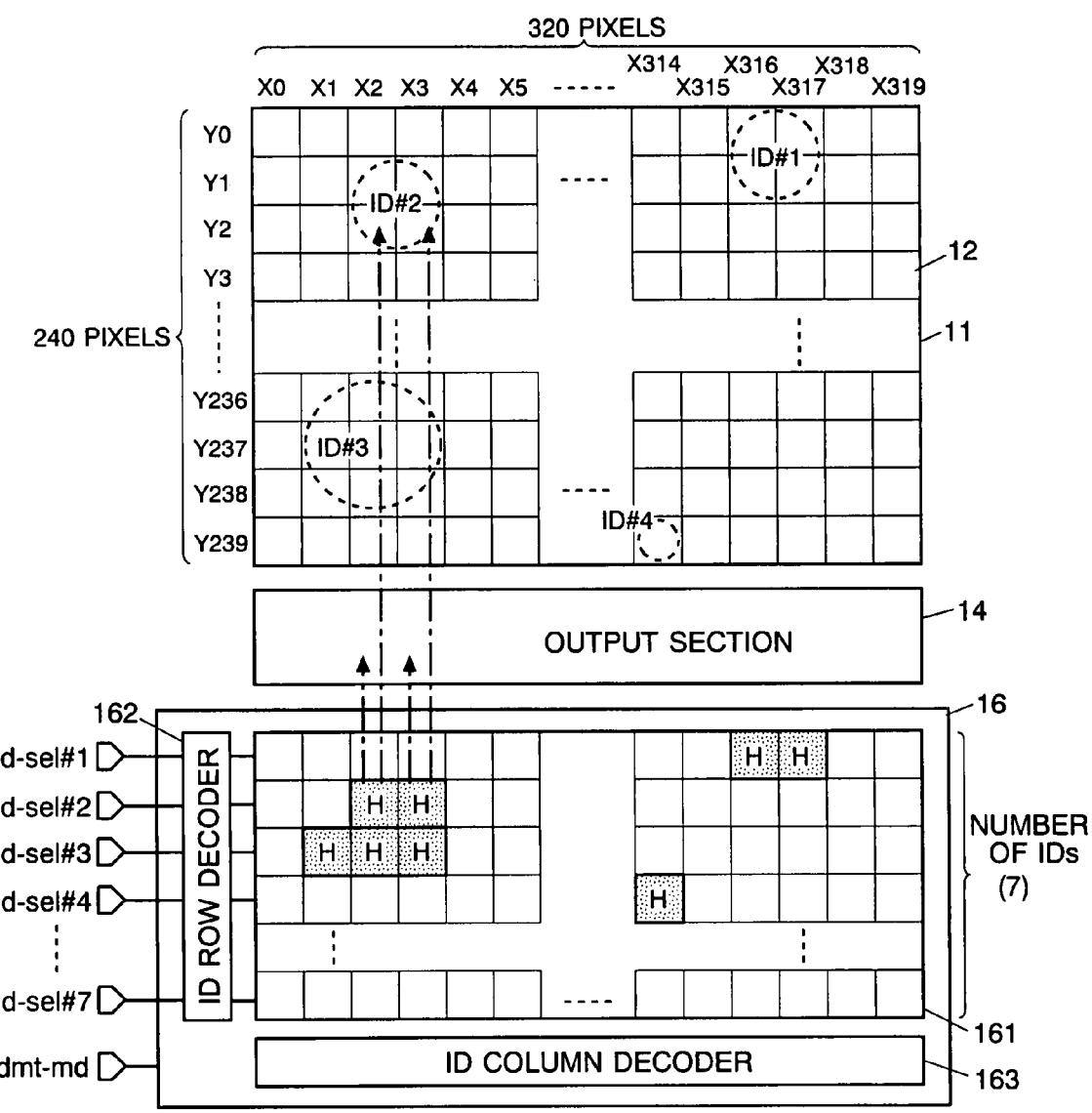
FIG. 8 is a block diagram showing the main components involved in the operation of the imaging device according to the present embodiment.

As shown in FIG. 8, the ID-mapping table circuit 16 includes a memory circuit 161 having a memory area for holding position information of one ID light-receiving area, and an ID row decoder 162 and an ID column decoder 163 for controlling the addressing of the memory area of the memory circuit 161.

In the memory circuit 161, the number of column addresses of the memory area is n, which means that this area can hold n bits of information for each ID light-receiving area (ID light). In the present example, the number N of ID lights that can be simultaneously handled is seven. Therefore, the memory area has a capacity of 7×n bits. However, it is possible to handle more than N ID lights by a technique to be described later. One bit of memory area can consist of one delay latch (D-latch). Each bit of the n-bit memory area corresponds to each column of the pixel cell array 11. Each D-latch represents one bit by taking either "High" or "Low" level. The "High" level indicates the presence of a signal-receiving pixel cell in the corresponding column. The "Low" level shows that all the pixel cells in the column are imaging pixel cells and no signal-receiving pixel cell exists in it.

The memory area of the memory circuit 161 holds only the information relating to the positions of the signal-receiving pixel cells in the row direction (i.e. the horizontal direction in FIG. 8). The information indicating the positions of the signal-receiving pixel cells in the column direction (i.e. the vertical direction in FIG. 8) is held in the controller 21 external to the image sensor 10. When pixel signals of the pixel cells in a given column are to be read, the information indicating whether or not any signal-receiving pixel cell is present in that column is supplied to the ID row decoder 162 in the form of an ID-selection signal (id-sel#1-#7). In practice, it is possible that multiple ID light-receiving areas exist in the same row (as in FIG. 8, where two ID light-receiving areas ID#1 and ID#2 are present in the row having the row address Y1). Therefore, N pieces of ID-selection signal lines (in the example of FIG. 8, there are seven lines) are provided in parallel. An ID-selection signal being at the "High" level indicates that an ID light-receiving area associated with that ID-selection signal line is present in the row being read at the moment.

In the ID-mapping table circuit 16, each column of the pixel cell array 11 is checked for an existence of any signal-receiving pixel cell on the basis of the data pattern in the memory area of the memory circuit 161 (which ID light-receiving area includes the signal-receiving pixel cell is not hereby questioned). The check result can be represented by a one-bit signal. A signal being at the "High" level indicates the existence of at least one signal-receiving pixel cell in the column concerned. A "Low" level signal indicates that no signal-receiving pixel cell exists at the column concerned in a row selected by the row decoder 13. There will be n pieces of existence-check results, the same as the number of the columns. The check result for a given column can be obtained by calculating a logical product (AND operation) of the output of each D-latch in that column and the ID-selection signal (id-sel#1-#7) corresponding to that D-latch and then calculating a logical add (OR operation) of all the logical products (N pieces). Such a calculator can be embodied by a combination of N pieces of AND gate elements and one OR gate element having N inputs or a logical circuit having equivalent functions.

The ID-mapping table circuit 16 has two operation modes: normal imaging mode and ID-obtaining mode. The controller 21 selects one of the two operation modes by a one-bit mode-selection signal (idmt-md). For example, the "High" level of the mode-selection signal designates the normal imaging mode and the "Low" level designates the ID-obtaining mode. The ID-mapping table circuit 16 generates a one-bit column-reset signal from the existence-check result of the signal-receiving pixel cell and the operation mode. The signal thereby generated is outputted to the column-reset signal line B3 for the column concerned. If the column-reset signal is at the "High" level, the load switch 42 assigned for that column in the output section 14 turns on. As a result, the transistor 41 as the load is connected to, the pixel output signal line B4, so that a current signal flows from the pixel cell 12. In addition, the switch inside the variable-gain amplifier 43 turns on to allow the current to flow into the circuit. Thus, the amplifier 43 generates an output. At the same time, the column-reset signal is also fed to the pixel cell 12.

More specifically, in the normal imaging mode (i.e. mode-selection signal=High), if a given column includes a signal-receiving pixel cell (i.e. existence-check result=High), the pixel signal of the pixel cell at the column is not read out (i.e. column-reset signal=Low). If the given column includes no signal-receiving pixel cell (i.e. existence-check result=Low), the pixel signal of the pixel cell at the column is read out (i.e. column-reset signal=High). In the ID-obtaining mode (i.e. mode-selection signal=Low), if a given column includes a signal-receiving pixel cell (i.e. existence-check result=High), the pixel signal of the pixel cell at the column is read out (i.e. column-reset signal=High). If the given column includes no signal-receiving pixel cell (i.e. existence-check result=Low), the pixel signal of the pixel cell at the column is not read out (i.e. column-reset signal=Low). Such a control can be realized by generating a column-reset signal for each column by calculating an exclusive logical product of the one-bit existence-check result and the one-bit mode-selection signal.

Figure 9:
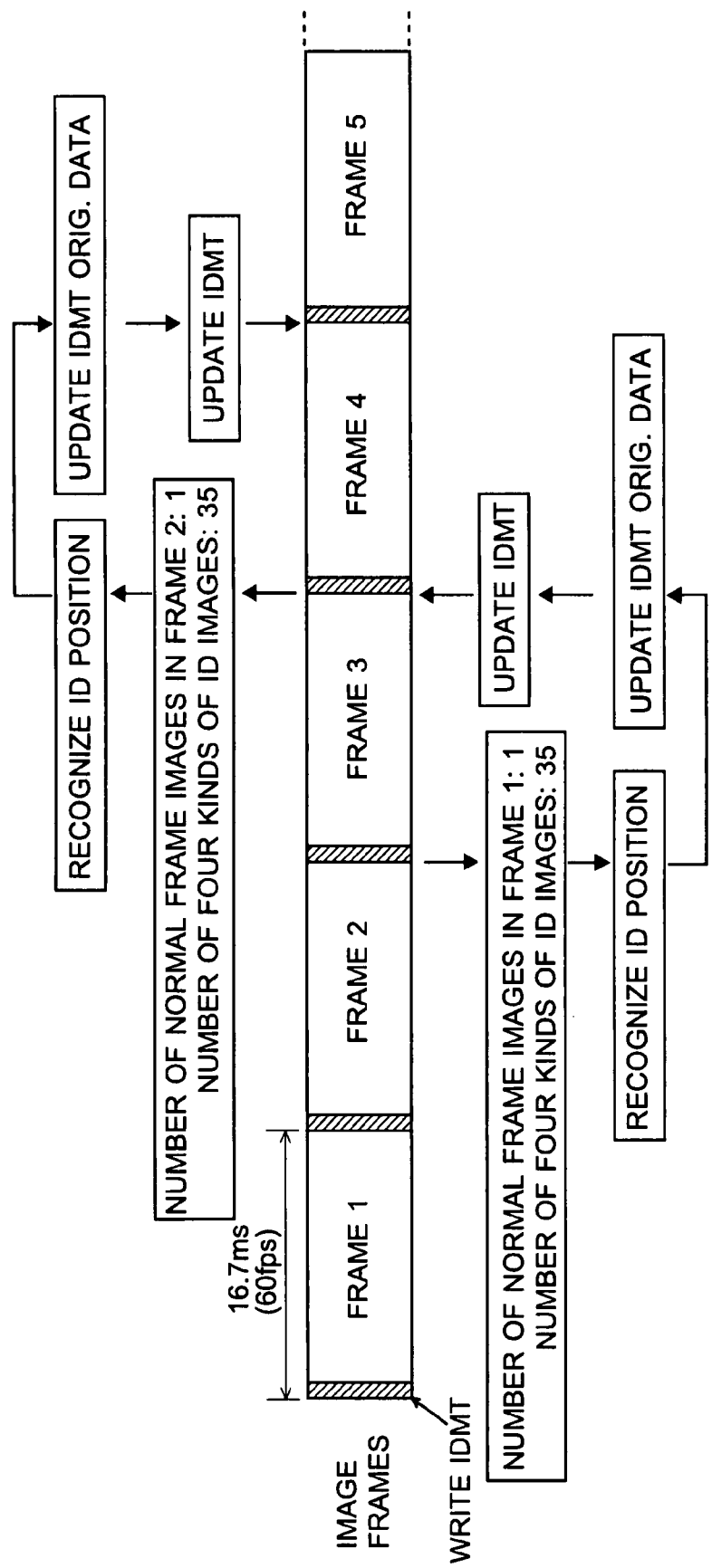
FIG. 9 is a timing chart roughly showing the process of collecting both image signals and ID information in parallel by the imaging device according to the present embodiment.
Figure 10:
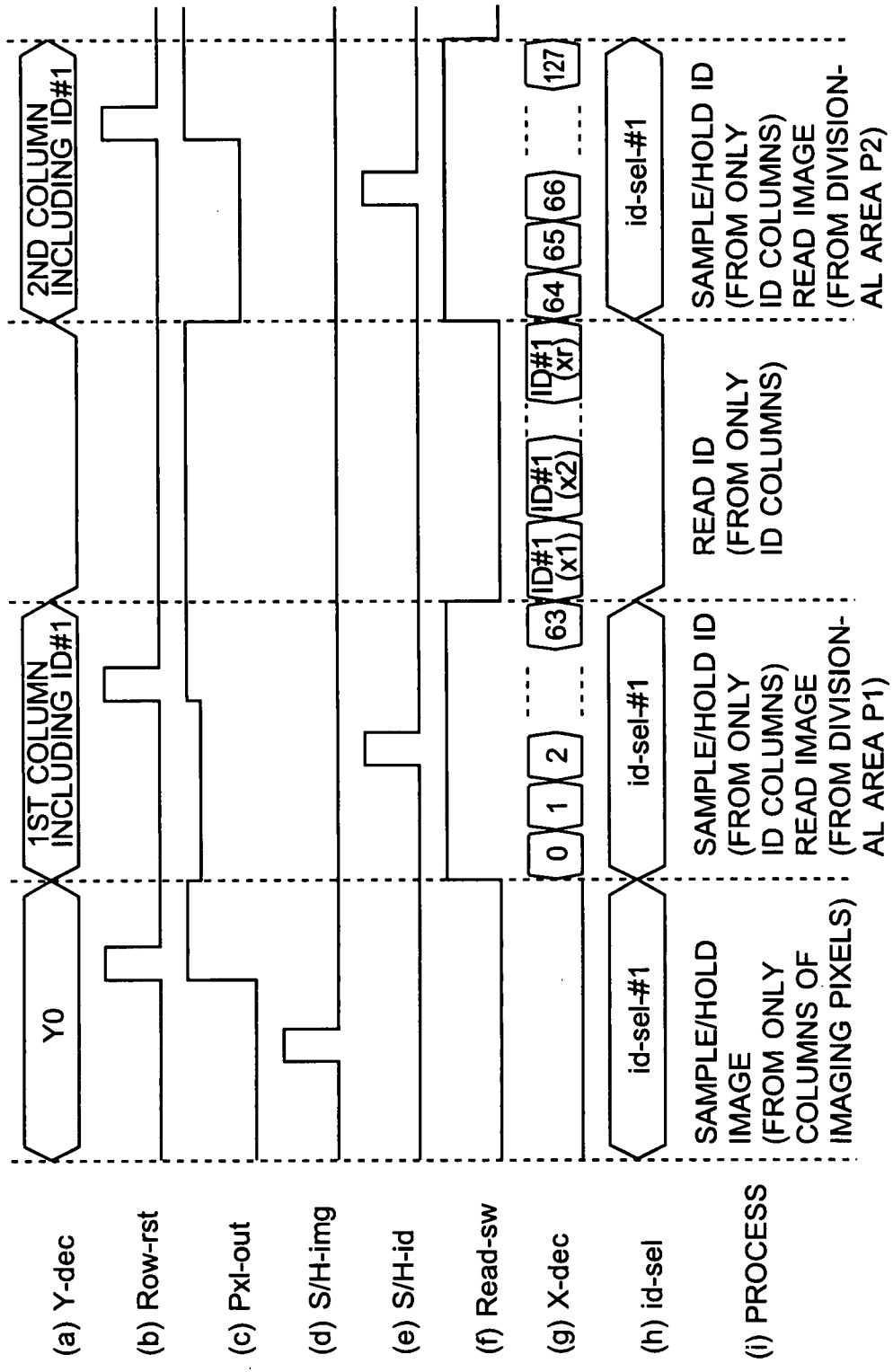
FIG. 10 is a detailed timing chart showing the operation of reading pixel signals in the imaging device according to the present embodiment.

Referring to the timing charts of FIGS. 9 and 10 in addition to FIGS. 4-8, a typical operation of the imaging device in the present embodiment having the construction described thus far is explained. The timing chart in FIG. 9 roughly shows the process of collecting both image signals and ID information in parallel by the imaging device according to the present embodiment, and the timing chart in FIG. 10 shows the details of the operation of reading the pixel signals. It should be noted that, though the standard frame frequency of imaging devices is 30 Hz, the frame frequency in the present example is set higher (60 Hz, two times the normal value) because a pilot signal of 15 Hz is used to detect the positions of ID light-receiving areas. It is possible to operate the present imaging device at a frame frequency of 30 Hz.

In the present imaging device, the readout operation is controlled in units of one frame of normal image: During the vertical blanking time within one frame of the normal image (i.e. 16.7 milliseconds in the present case), the data held in the memory area of the ID-mapping table circuit 16 (i.e. the position information of the signal-receiving pixel cells) are updated. For example, the pilot signal superimposed on the ID information is located within the normal image to define the ID light-receiving area, after which the positions of the signal-receiving pixel cells are determined, as explained earlier. Once the ID light-receiving area has been defined and the ID information has been collected throughout the period of time corresponding to one frame of normal image, it is possible to re-calculate the position of the center of gravity of each ID light-receiving area, or the position of the signal-receiving pixel cell at which the received light is the strongest, and then update the data held in the memory area of the ID-mapping table circuit 16 on the basis of the re-calculated position.

The imaging device whose parameters are designed as shown in FIG. 3 is capable of repeatedly reading pixel signals of each signal-receiving pixel cells in the same ID light-receiving area 35 times during one frame of normal image. Since one ID image is created for each readout process, each of up to seven ID light-receiving areas (ID#1-ID#7) will have 35 pieces of ID images created. The data processor 22 recognizes the position of each ID light-receiving area from the 35 pieces of ID images and follows the movement of the center of gravity of the ID light-receiving area. Then, if necessary, it updates the original data of the ID-mapping table stored in the controller 21 and also renews the data held in the memory area of the ID-mapping table circuit 16 during the next vertical blanking time.

Updating of the data held in the memory area of the ID-mapping table circuit 16, i.e. the position information of the signal-receiving pixel cells, involves the following steps: All the bits of the memory area of the memory circuit 161 are reset to the "Low" level at the end of the vertical blanking time of one image frame. Then, an ID-selection signal (id-sel#1-#7) is generated to select one row of the memory area in which the data (or bit pattern) are to be changed. Further, a column including the signal-receiving pixel cell concerned is selected through the ID-column decoder 163. Finally, the "High" level bit is written into the designated D-latch. The steps described thus far are repeatedly performed for every signal-receiving pixel cell of all the ID light-receiving areas within the vertical blanking time. FIG. 8 shows the memory area of the memory circuit 161 into which the bit patterns of four ID light-receiving areas (ID#1-ID#4) have been written.

After the vertical blanking time, when the readout of pixel signals is started, the row decoder 13 selects the first row address Y0 and changes the row-selection signal (Row-sel) for the selected row to the "High" level, as shown in FIG. 10(a). As a result, the fourth transistor 35 of every pixel cell 12 in that column turns on. In this state, the current signal generated due to the photodiode potential can flow through the third transistor 34 (i.e. the source follower amplifier) to the pixel output signal line B4. At this moment, the mode-selection signal (idmt-md) is set to the normal imaging mode. Therefore, at every column where the pixel cell in the selected row is an imaging pixel cell, the load switch 42 turns on, so that the load current source is connected and a current is supplied into the circuit of the variable-gain amplifier 43. In contrast, at a column where a signal-receiving pixel cell exists, the output current does not flow and the variable-gain amplifier 43 remains inactive, so that little power is thereby consumed.

The output voltage of the variable-gain amplifier 43 at a column from which a pixel signal has been read out is transferred to the capacitor 46 when the image sampling-and-holding signal (S/H-img) is switched to the "High" level and thereby turns the switch 45 on, as shown in FIG. 10(d). This action simultaneously takes place at all the imaging pixel cells in the same row (Y0). Subsequently, the row decoder 13 switches the row-reset signal (Row-rst) to the "High" level, as shown in FIG. 10(b). At this moment, the column-reset signal (Clm-rst) for the imaging pixel cells is also at the "High" level. Therefore, the photodiode potential in the imaging pixel cell is reset to the voltage Vr supplied through the reset voltage line B5. Thus, the sampling-and-holding operation of the pixel signal generated by the imaging pixel cells at the row address Y0 is completed.

Next, under the command of the controller 21, the row decoder 13 selects the row address of the first row of one or more rows where the ID light-receiving area ID#1 exists and switches the row-selection signal (Row-sel) for the selected row to the "High" level. In the case of FIG. 8, the row address Y0 is selected. As a result, the fourth transistor 35 of every pixel cell 12 in that row turns on. In this state, the current signal generated due to the photodiode potential can flow through the third transistor 34 (i.e. the source follower amplifier) to the pixel output signal line B4. At this moment, the mode-selection signal is set to the ID-obtaining mode. Therefore, according to the row-reset signals fed from the ID-mapping table circuit 16, the load switch 42 turns on only at each column where a signal-receiving pixel cell exists, whereby the load current source is connected and a current is supplied into the circuit of the variable-gain amplifier 43. In contrast, at the majority of columns in which imaging pixel cells are present, the readout of pixel signals does not take place and the variable-gain amplifier 43 remains inactive, so that little power is consumed.

The output of the variable-gain amplifier 43 at the columns where a signal-receiving pixel cell exists (in the case of FIG. 8, at the column addresses X316 and X317) is transferred to the capacitor 48 when the ID sampling-and-holding signal (S/H-id) is switched to the "High" level and the switch 47 turns on, as shown in FIG. 10(e). This action simultaneously takes place at all the signal-receiving pixel cells in the same row (Y0). Subsequently, the row decoder 13 switches the row-reset signal (Row-rst) to the "High" level, as shown in FIG. 10(b). At this moment, the column-reset signal (Clm-rst) for the signal-receiving pixel cells is also at the "High" level. Therefore, the photodiode potential in the signal-receiving pixel cell is reset to the voltage Vr supplied through the reset voltage signal line B5, as explained earlier. Thus, the sampling-and-holding operation of the pixel signals generated by the signal-receiving pixel cells in the first row of one or more rows where the ID light-receiving area ID#1 exists is completed.

In parallel to this sampling-and-holding operation, the process of reading the pixel signal of the imaging pixel cell previously held by the capacitor 46 is carried out: As shown in FIG. 10(f), the readout-selection signal (Read-sw) is set to the "High" level to change the image/ID-selection switch 49 to the capacitor 46. The column decoder 15 turns on one output-selection switch 50 after another by switching the output column selection signal (Clm-sel) to the "High" level while changing the column address from X0 in ascending order (FIG. 10(g)). As a result, the pixel signal held by each capacitor 46 is outputted to the horizontal output signal line B9 one after another. In the present embodiment, since the pixel cells are divided into five groups along the column direction, the readout process is discontinued once when the round of column addresses X0 through X63 is completed. If a signal-receiving pixel cell is included in this readout range, the pixel signal at that column is invalid. Therefore, the column address of such a column may be skipped. Alternatively, it is acceptable to discard the output while maintaining the column address (i.e. dummy reading).

Next, the pixel signals of the signal-receiving pixel cells held just before by the ID-holding capacitor 48 are read out: As shown in FIG. 10(f), the readout-selection signal (Read-sw) is set to the "Low" level to change the image/ID-selection switch 49 to the capacitor 48. The column decoder 15 updates the column addresses where the ID light-receiving area ID#1 exists in ascending order of the column address, referring to the information memorized in the ID-mapping table circuit 16 or the information written in the controller 21 (FIG. 10(g)). At the column addresses selected, the output column selection signal (Clm-sel) is set to the "High" level to turn on the output-selection switch 50. As a result, the pixel signal held by each capacitor 48 is sequentially outputted to the horizontal output signal line B9. In FIG. 10(g), the ID light-receiving area ID#1 is assumed to have s (rows)×r (columns) pixels, so that the r pixel signals are sequentially read out. In FIG. 8, two column addresses X316 and X317 are sequentially selected and the pixel signals held by the capacitors 48 at these columns are outputted.

Subsequently, under the command of the controller 21, the row decoder 13 selects the row address of the second row of one or more rows where the ID light-receiving area ID#1 exists and switches the row selection signal (Row-sel) for the selected row to the "High" level. In the case of FIG. 8, the row address Y1 is selected. Then, the same sampling-and-holding operation as previously performed on the pixel signals of the signal-receiving pixel cells at the row address Y0 is performed to transfer each pixel signal to the capacitor 48 at each column and reset the photodiode potential in the signal-receiving pixel cell at which the readout operation has been completed. In parallel to this sampling-and-holding operation, the readout process of the pixel signals of the imaging pixel cells that have been initially held by the image-holding capacitors 46 is resumed. Since the readout process of the pixel cells in the row address Y0 has been completed up to the column address X63, the operation is continued from the column address X64 in ascending order, turning on one output-selection switch 50 after another to sequentially output the pixel signals held by the capacitors 46.

By repeating the sampling-and-holding operation and the readout operation described thus far, it is possible to extract pixel signals necessary for creating one frame of image and, in parallel, repeatedly read the pixel signals of the signal-receiving pixel cells that are receiving an ID light. After the imaging signals for one frame of image have been collected, the data processor 22 reproduces a piece of image and also restores ID information.

The embodiment described thus far is a mere example of the present invention and can be changed, modified or expanded within the scope of the present invention.

For example, to follow a quick movement of ID-receiving pixel cells due to a camera shake or similar phenomenon, it is possible to individually process each ID image immediately after reading it rather than merge the ID image into one frame of normal image and process the resultant image. In a preferable example, the position of the center of gravity of each ID light-receiving area is calculated every time one ID image is read, and then the position of the pixel cells to be subsequently read for acquiring the next ID image is updated according to the calculation result.

In the previous embodiment, the photodiode potential of pixel cells was reset immediately after the pixel signals of those pixel cells had been read to produce an ID image. However, it is not always necessary to reset it every time the signals are read. In practice, it is unnecessary to reset the potential until the pixel value is saturated. Even if the potential is not reset, an ID image can be obtained by calculating the differences between the latest pixel values and the previous pixel values collected to create the preceding ID image.

In the previous embodiment, the variable-gain amplifier was provided for each column in order to reduce the noise in a pixel signal having a low signal level. The noise can be reduced by different methods. An example is a so-called active reset technique, which uses a circuit for reducing the reset noise of pixel cells for each column of the image cells 11. The circuit generates a feedback signal based on the read pixel value and feeds it into a resetting transistor provided in the pixel. This technique is effective in reducing the noise of the ID light, whose charging time is relatively short.

In both normal imaging and ID-obtaining modes, the charging time may be intentionally shortened by shifting the timing of resetting the photodiode in the pixel cell so as to expand the dynamic range to cover larger strength values of the incident light. Naturally, shortening the charging time is disadvantageous for detecting weak incident light. Therefore, it is preferable to add a circuit for adaptively regulating the charging time.

In the previous embodiment, the data in the memory area of the ID-mapping table circuit were updated during the vertical blanking time within one frame of normal image. It is also possible to renew the data in the memory area of the ID-mapping table circuit during an appropriate period of time between the vertical blanking times of neighboring frames. For example, suppose that the number of ID light-receiving areas to be simultaneously processed is larger than the row number of the memory area. To deal with such a case, it is possible to repeat the following process during one image frame: the bit pattern in the ID-mapping table circuit corresponding to an ID light-receiving area in which the pixel signals of the signal-receiving pixel cells have been read out at least one time is renewed with a new bit pattern corresponding to another ID light-receiving area, and then the readout of pixel signals of signal-receiving pixel cells is performed according to the new bit pattern.

If the readout process of pixel cells is changed, for example if the division conditions for continuously reading pixel signals of imaging pixel cells are changed, it is naturally necessary to accordingly change the control process.

The embodiment can be further changed, modified or expanded in various forms other than the previous ones within the spirit and scope of the present invention, which is clearly defined in the Claims section of this patent application.

The invention claimed is:

1. A method of reading pixel signals from an image sensor having a pixel cell array with a number of pixel cells two-dimensionally arranged in an imaging device for capturing images of an imaging area within which a light-emitter producing an information light whose frequency is higher than the normal frame frequency is present and for collecting both image information of the imaging area and identification information transmitted by the information light, the method comprising:

classifying all the pixel cells into two types: one or more pixel cells receiving the information light, which are called signal-receiving pixel cells, and the other pixel cells, which are called imaging pixel cells;

dividing a first period of time for sequentially reading the pixel signals from the imaging pixel cells for constructing one frame of image into a plurality of fractional time sections, and determining a readout procedure so that a second period of time for reading the pixel signal from the signal-receiving pixel cell is inserted between each neighboring pair of the time sections; and reading the pixel signal from the same signal-receiving pixel cell more than one time during one round of readout of the pixel signals from all the imaging pixel cells through all the time sections.

2. The method of reading signals from an imaging device according to claim 1, wherein the pixel cell array has pixel cells two-dimensionally arranged in a form of a matrix having m rows and n columns (where m and n are integers larger than one) and a divisional unit of the first period of time is one row of the pixel cell array.

3. The method of reading signals from an imaging device according to claim 1, wherein the pixel cell array has pixel cells two-dimensionally arranged in a form of a matrix having m rows and n columns (where in and n are integers larger than one) and a divisional unit of the first period of time corresponds to a fractional section of one row of the pixel cell array.

4. The method of reading signals from an imaging device according to claim 2, wherein a readout of the pixel signals from the imaging pixel cells included in the divisional unit and a readout of the pixel signal from one or more signal-receiving pixel cells located in one row within an information light-receiving area onto which one information light is cast are alternately performed.

5. The method of reading signals from an imaging device according to claim 1, wherein, if the number of the signal-receiving pixel cells within one information light-receiving area is large, the number of the signal-receiving pixel cells from which the pixel signal is to be read is reduced by skipping a portion of the signal-receiving pixel cells or integrating the pixel signals of a plurality of the signal-receiving pixel cells.

6. An imaging device for sequentially reading pixel signals by a method according to claim 1, comprising;

a) a pixel cell array with a plurality of pixel cells two-dimensionally arranged in a form of a matrix having m rows and n columns (where m and n are integers larger than one), each pixel cell having a photoelectric conversion element for converting a received light to a charge signal and storing the charge signal;

b) a position information storage section for keeping information indicating a position of one or more signal-receiving pixel cells receiving the information light among all the pixel cells;

c) a column selection controller operating on a basis of the information stored in the position information storage section, for determining, column by column, whether the pixel cell at a given column in a row specified within the pixel cell array is a signal-receiving pixel cell, and for generating a column selection information based on a result of the determination, where the colunm selection information decides whether or not the pixel signal should be read from the pixel cell concerned; and d) an output current controller for preventing an output current from flowing into the pixel cell at any column that has not been selected for readout by the column selection controller.

7. The imaging device according to claim 6, wherein the position information storage section has a memory area having a size of one row and n columns or p rows and n columns ($2 \leq p \leq m$) to be associated with one information light-receiving area, where a binary signal level of one bit of the memory area corresponding to one column of the pixel cell array is determined according to whether a signal-receiving pixel cell belonging to the information light-receiving area concerned is present within that particular concerned.

8. The imaging device according to claim 6, wherein each pixel cell included in the pixel cell array includes a potential-reset element for a pixel-by-pixel resetting of an electric potential charged in the photoelectric conversion element inside the pixel cell.

9. The imaging device according to claim 8, wherein the potential-reset element includes two kinds of transistors connected in series, one of which is turned on and off by a column-reset signal supplied through a column-reset line provided for each column of the pixel cell array, and the other is turned on and off by a row-reset signal supplied through a row-reset line provided for each row of the pixel cell array.

10. The imaging device according to claim 6, wherein each column of the pixel cell array is provided with a variable-gain amplifier for amplifying the pixel signals produced by the pixel cells in the column with a different gain determined according to a level of the pixel signals.

* * * * *